United States Patent
Taki

(10) Patent No.: US 11,111,929 B2
(45) Date of Patent: Sep. 7, 2021

(54) BLOWER FAN HAVING IMPELLER AND MOTOR

(71) Applicant: Rinnai Corporation, Aichi (JP)

(72) Inventor: Hirotoshi Taki, Aichi (JP)

(73) Assignee: Rinnai Corporation, Aichi (JP)

(*) Notice: Subject to any disclaimer, the term of this patent is extended or adjusted under 35 U.S.C. 154(b) by 26 days.

(21) Appl. No.: 16/534,643

(22) Filed: Aug. 7, 2019

(65) Prior Publication Data

US 2020/0200182 A1  Jun. 25, 2020

(30) Foreign Application Priority Data

Dec. 25, 2018 (JP) .............................. JP2018-241264

(51) Int. Cl.

| | |
|---|---|
| *F04D 29/26* | (2006.01) |
| *F04D 29/66* | (2006.01) |
| *F04D 17/16* | (2006.01) |
| *F04D 25/08* | (2006.01) |
| *F04D 29/60* | (2006.01) |
| *F04D 25/06* | (2006.01) |
| *F04D 29/054* | (2006.01) |
| *F04D 29/62* | (2006.01) |

(52) U.S. Cl.
CPC .......... *F04D 29/263* (2013.01); *F04D 17/16* (2013.01); *F04D 29/668* (2013.01); *F04D 25/06* (2013.01); *F04D 25/08* (2013.01); *F04D 29/054* (2013.01); *F04D 29/601* (2013.01); *F04D 29/626* (2013.01); *F16D 2300/22* (2013.01)

(58) Field of Classification Search
CPC ...... F04D 29/263; F04D 29/668; F04D 17/16; F04D 29/626; F04D 29/282; F04D 29/002; F04D 29/05; F04D 29/054; F16D 1/112

See application file for complete search history.

(56) References Cited

U.S. PATENT DOCUMENTS

| | | | | |
|---|---|---|---|---|
| 3,084,963 | A | * | 4/1963 | Beehler ................. F04D 29/263 403/226 |
| 5,030,068 | A | * | 7/1991 | Jacobs .................. F04D 29/668 417/363 |

(Continued)

FOREIGN PATENT DOCUMENTS

JP        2003-023750 A    1/2003

*Primary Examiner* — Nathan C Zollinger
*Assistant Examiner* — Timothy P Solak
(74) *Attorney, Agent, or Firm* — Nakanishi IP Associates, LLC

(57) ABSTRACT

A rotational shaft is placed through insertion holes of rubber washers sandwiching a portion of an impeller having a mount hole. The impeller is mounted on the rotational shaft with a nut on a threaded distal end portion of the rotational shaft. The rotational shaft of the motor includes a locking surface. The insertion holes of the rubber washers each have the same shape as the cross-sectional shape of the rotational shaft. The mount hole of the impeller includes a spacing portion extending at an angle from the linear portion of the insertion hole of each rubber washer away from the locking surface of the rotational shaft. Although the impeller rotates with respect to the rotational shaft under a frictional force applied from the nut tightened against the rotational shaft, this structure prevents metallic contact between the impeller at the mount hole and the locking surface of the rotational shaft.

6 Claims, 8 Drawing Sheets

Fig. 1

(56) References Cited

U.S. PATENT DOCUMENTS

| | | | | | |
|---|---|---|---|---|---|
| 5,224,238 | A | * | 7/1993 | Bartlett | A47L 5/00 15/327.2 |
| 6,190,134 | B1 | * | 2/2001 | Hudson | F04D 29/263 415/216.1 |
| 6,220,818 | B1 | * | 4/2001 | Andulics | B63H 1/20 416/178 |
| 6,533,537 | B1 | * | 3/2003 | Nakada | F04D 29/188 415/106 |
| 2010/0307013 | A1 | * | 12/2010 | Refson | B24B 23/02 30/475 |
| 2015/0003992 | A1 | * | 1/2015 | Kojima | F04D 29/329 416/234 |

* cited by examiner

BLOWER FAN HAVING IMPELLER AND MOTOR

BACKGROUND OF INVENTION

Field of the Invention

The present invention relates to a blower fan that blows air by rotating an impeller using a motor.

Background Art

Blower fans are used widely for blowing air with an impeller rotated by a motor. An impeller of a blower fan can be decentered from a rotational shaft of a motor and cause vibration and noise, and thus is to be centered when mounted on the rotational shaft of the motor. In many blower fans, an impeller is mounted on a rotational shaft of a motor in the manner described below.

The rotational shaft of the motor is processed to have a threaded portion at its distal end. The rotational shaft of the motor further has, within a predetermined length from the distal end, a portion with a D-shaped cross section that is formed by processing the peripheral surface of the rotational shaft to be flat in one direction. The impeller has, at the rotation center, a mount hole that is also D-shaped. The mount hole is sized to fittingly receive the D-shaped cross section of the rotational shaft of the motor. After the rotational shaft of the motor is placed through the mount hole, a nut is placed on the threaded portion at the distal end of the rotational shaft to fix the impeller to the rotational shaft. The mount hole is at the rotation center of the impeller, and is sized to fittingly receive the rotational shaft. The impeller is thus centered when mounted on the rotational shaft of the motor. The rotational shaft of the motor and the mount hole of the impeller are both D-shaped to prevent the impeller from rotating around each other.

In this blower fan, high-frequency vibration called electromagnetic vibration of the motor can propagate from the rotational shaft of the motor to the impeller and generate large noise. To avoid this, a known blower fan includes an impeller mounted on a rotational shaft with adhesive members as washers sandwiching a mount hole of the impeller, and then further with metal washers placed on those washers. In this blower fan, the adhesiveness of the washers between the impeller and the metal washers absorbs any electromagnetic vibration of the motor, thus reducing noise generation (Patent Literature 1).

CITATION LIST

Patent Literature

Patent Literature 1: Japanese Unexamined Patent Application Publication No. 2003-023750

However, the above blower fan cannot reduce noise sufficiently for the reason below. A nut tightened to fix the impeller can have a frictional force that rotates the impeller with respect to the rotational shaft. The impeller at the D-shaped mount hole is then pressed strongly against the D-shaped rotational shaft, causing metallic contact between them. The contact part then transmits the electromagnetic vibration of the motor to the impeller.

In response to the above issue, one or more aspects of the present invention are directed to a blower fan that sufficiently reduces noise resulting from electromagnetic vibration of a motor.

SUMMARY OF INVENTION

A blower fan according to one or more aspects of the present invention has the structure described below. A blower fan for blowing air by rotating an impeller with a motor includes a motor including a rotational shaft having a threaded portion at a distal end of the rotational shaft, an impeller having a mount hole that is a through-hole at a rotation center and through which the rotational shaft is placed, rubber washers sandwiching a portion of the impeller having the mount hole and having insertion holes through which the rotational shaft is placed, and a nut placed on the threaded portion of the rotational shaft placed through the impeller and the rubber washers to fix the impeller to the rotational shaft. The rotational shaft includes, within a predetermined length from the distal end, a locking surface that is a flat portion of a peripheral surface of the rotational shaft to lock rotation of the impeller with respect to the rotational shaft. The insertion holes of the rubber washers and the mount hole of the impeller through which the rotational shaft is placed each include an arc portion positioned with respect to the peripheral surface of the rotational shaft and a linear portion positioned with respect to the locking surface of the rotational shaft. The mount hole of the impeller further includes a spacing portion that is spaced from the locking surface and extends at an angle from the linear portion in a direction away from the locking surface of the rotational shaft.

In the blower fan according to the above aspect of the present invention, the rotational shaft is placed through the mount hole of the impeller with the portion of the impeller having the mount hole sandwiched between the rubber washers. The nut is then placed on the threaded portion at the distal end of the rotational shaft to fix the impeller to the rotational shaft of the motor. The rotational shaft includes, within the predetermined length from the distal end, the locking surface that is the flat portion of the peripheral surface for locking rotation of the impeller with respect to the rotational shaft. The rotational shaft may include a plurality of locking surfaces in the circumferential direction. When the rotational shaft includes a single locking surface, the single locking surface is formed as a D-cut surface. The insertion holes of the rubber washers through which the rotational shaft is placed each include the arc portion positioned with respect to the peripheral surface of the rotational shaft, and the linear portion positioned with respect to the locking surface of the rotational shaft. Like the insertion holes of the rubber washers, the mount hole of the impeller also includes the arc portion positioned with respect to the peripheral surface of the rotational shaft, and the linear portion positioned with respect to the locking surface of the rotational shaft. However, the mount hole of the impeller further includes the spacing portion that is spaced from the locking surface and extends at an angle from the linear portion positioned with respect to the locking surface of the rotational shaft.

Although the impeller may rotate with respect to the rotational shaft under a frictional force applied from the nut tightened to mount the impeller to the rotational shaft of the motor, the spacing portion of the mount hole is spaced from the locking surface to prevent the impeller at the mount hole from being pressed strongly against the locking surface of the rotational shaft and from causing metallic contact between them. This structure thus prevents the electromagnetic vibration of the motor from propagating to the impeller, and sufficiently reduces noise of the blower fan.

In the blower fan according to the above aspect of the present invention, the rotational shaft may include a D-cut surface to be the locking surface. In this structure, the spacing portion included in the mount hole of the impeller may be linear, and a distance between a tangent to the arc portion parallel to the spacing portion and the spacing portion may be greater than or equal to a distance between a tangent to the arc portion parallel to the linear portion of the mount hole and the linear portion.

Shortening the distance between the spacing portion of the mount hole and the tangent to the arc portion parallel to the spacing portion accordingly extends the length of the linear portion of the mount hole. The nut tightened to mount the impeller having the mount hole with this shape (including the extended linear portion) to the rotational shaft can cause the extended linear portion of the mount hole to be pressed strongly against the locking surface (D-cut surface) of the rotational shaft and causes metallic contact between them when the impeller is urged to rotate with respect to the rotational shaft. In contrast, the distance between the spacing portion included in the mount hole and the tangent to the arc portion parallel to the spacing portion is greater than or equal to the distance between the linear portion and the tangent to the arc portion parallel to the linear portion to prevent the linear portion of the mount hole from being pressed strongly against the locking surface (D-cut surface) of the rotational shaft and from causing metallic contact between them when the impeller is urged to rotate with respect to the rotational shaft. This structure prevents noise resulting from the electromagnetic vibration of the motor.

In the blower fan according to the above aspect of the present invention, the rubber washers and/or the impeller may include a locking unit to lock rotation of the impeller with respect to the rubber washers about the rotational shaft.

The insertion holes of the rubber washers each include a linear portion in addition to the arc portion. The rubber washers can thus be positioned with respect to the rotational shaft in the rotation direction. The locking unit that locks rotation of the impeller with respect to the rubber washers can also position the impeller with respect to the rotational shaft in the rotation direction. This structure prevents instability in the positional relationship between the spacing portion of the mount hole and the locking surface of the rotational shaft when the rotational shaft is placed through the impeller and the rubber washers. Although the impeller rotates with respect to the rotational shaft under a frictional force applied from the nut tightened, this structure prevents the spacing portion of the mount hole from being pressed strongly against the locking surface of the rotational shaft.

In the blower fan according to the above aspect of the present invention, the locking unit may include a protrusion on at least one of the rubber washers and a receiving hole in the impeller receiving the protrusion.

In this manner, the locking unit can be formed easily. When the nut is tightened, this structure prevents the spacing portion of the mount hole from being pressed strongly against the locking surface of the rotational shaft.

DETAILED DESCRIPTION

Figure 1:
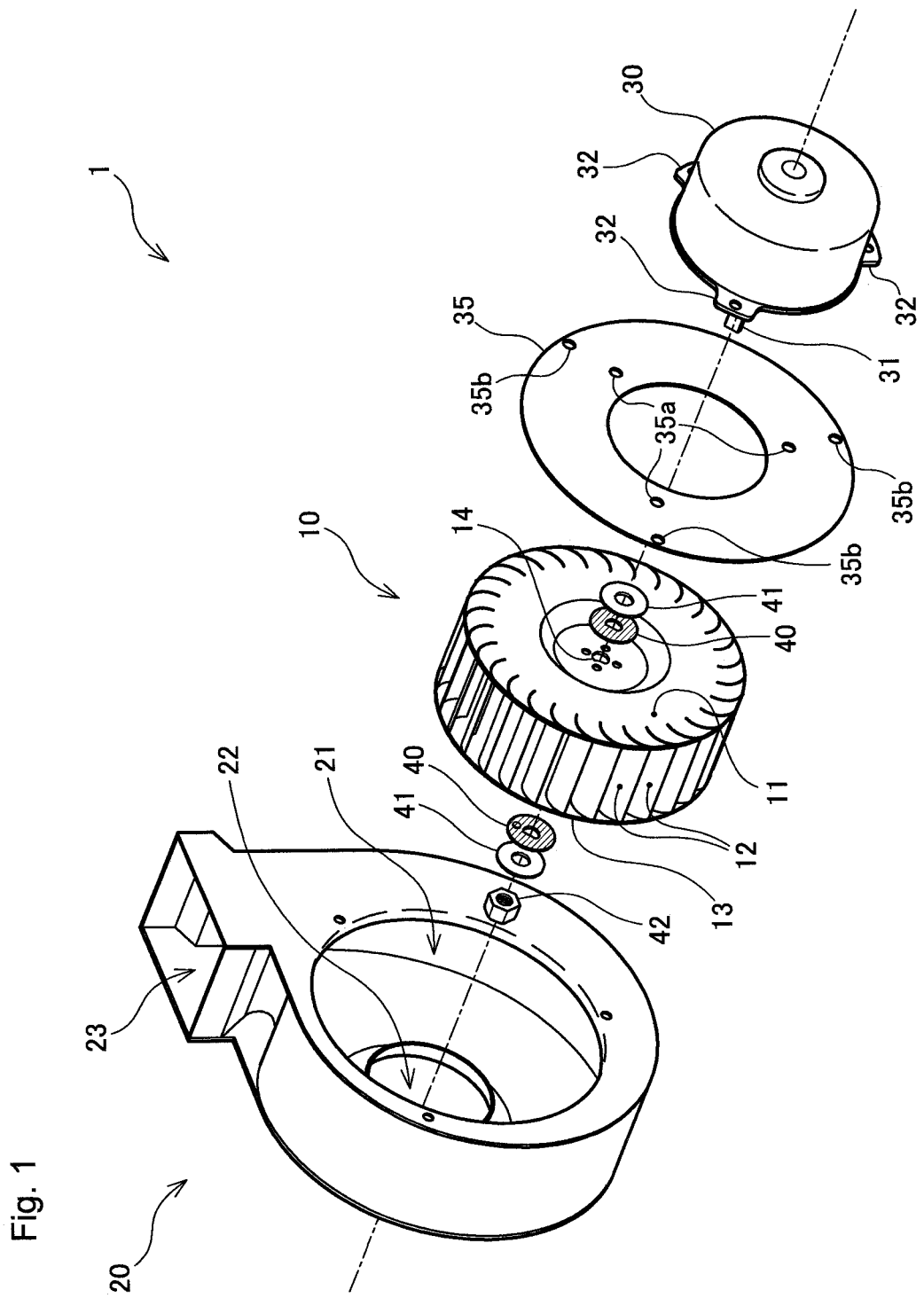
FIG. 1 is an exploded view of a blower fan 1 according to one embodiment showing its main components.

FIG. 1 is an exploded view of a blower fan 1 according to one embodiment showing its main components. As shown in the figure, the blower fan 1 according to the present embodiment includes an impeller 10 that is rotated to blow air, a fan case 20 accommodating the impeller 10, a motor 30 to rotate the impeller 10, and a fixing plate 35 for fixing the motor 30 to the fan case 20.

The impeller 10, which is a sirocco fan, includes a substantially disk-shaped rotatable disk 11, a plurality of blades 12 each having one end attached to the periphery of the rotatable disk 11, and an annular coupling plate 13 coupling the other ends of the blades 12. The rotatable disk 11 has a mount hole 14 at the rotation center of the impeller 10. Although the impeller 10 is a sirocco fan in the present embodiment, the impeller 10 may be any other type of impeller, such as a propeller fan.

The fan case 20, which is an assembly of metal plates, has a circular opening 21 with a diameter larger than the outer diameter of the impeller 10, a bell-mouth inlet 22 through which air flows into the fan case 20, and an outlet 23 through which air flows out of the fan case 20.

The motor 30 is a three-phase alternating current motor that is substantially cylindrical. The motor 30 has a rotational shaft 31 protruding from the center of one end face of the cylinder. The rotational shaft 31 has an external thread at its distal end. The motor 30 also has, at three positions on the periphery of its end face having the protruding rotational shaft 31, attaching portions 32 for attaching the motor 30 to the fixing plate 35. The attaching portions 32 protrude radially outward.

The fixing plate 35, which is an annular plate, has an outer diameter larger than the diameter of the opening 21 in the fan case 20. The fixing plate 35 has, at three positions radially outward from the central opening, screw holes 35a to receive screws for fastening the attaching portions 32 of the motor 30. The fixing plate 35 also has, at three positions radially inward from its periphery, screw holes 35b to receive screws with which the fixing plate 35 is fastened to the fan case 20.

To mount the impeller 10 on the rotational shaft 31 of the motor 30, the attaching portions 32 of the motor 30 are first attached to the fixing plate 35 with screws (not shown) placed through the screw holes 35a. A metal washer 41 and a rubber washer 40 are then attached to the rotational shaft 31 of the motor 30 in this order. The rotational shaft 31 is then placed through the mount hole 14 in the rotatable disk 11. A rubber washer 40 and a washer 41 are then attached to the rotational shaft 31 of the motor 30 in this order. A nut 42 is finally attached to the external thread at the distal end of the rotational shaft 31. In this manner, the impeller 10, the fixing plate 35, and the motor 30 are fixed together. The impeller 10 is then placed into the fan case 20 through the opening 21 in the fan case 20, and the fixing plate 35 is fastened to the fan case 20 with screws (not shown) received in the screw holes 35b in the fixing plate 35.

Figure 2:
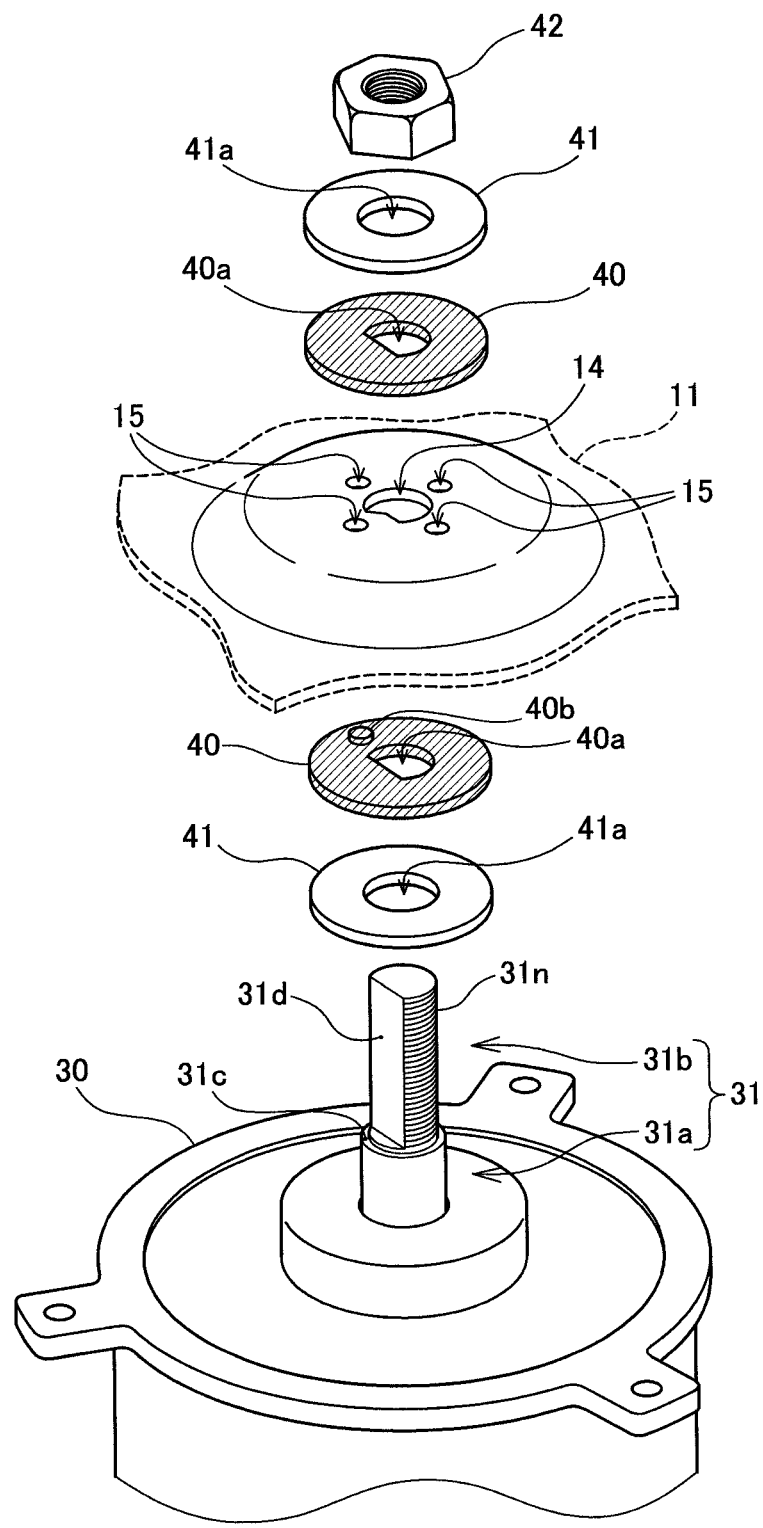
FIG. 2 is an enlarged view showing, in detail, a rotational shaft 31 of a motor 30 on which an impeller 10 is to be mounted, a mount hole 14 of the impeller 10 to receive the rotational shaft 31, rubber washers 40, and washers 41.

FIG. 2 is an enlarged view showing, in detail, the rotational shaft 31 of the motor 30 on which the impeller 10 is to be mounted, the mount hole 14 of the impeller 10 to receive the rotational shaft 31, the rubber washers 40, and the washers 41. As shown in the figure, the rotational shaft 31 of the motor 30 includes a large-diameter basal part 31a (adjacent to the body of the motor 30), a small-diameter part 31b having a smaller diameter than the large-diameter part 31a, and an annular step 31c between the large-diameter part 31a and the small-diameter part 31b. The rotational shaft 31 further has, in an area from the distal end of the small-diameter part 31b to near the step 31c, a threaded portion 31n on the peripheral surface of the rotational shaft 31 (on the small-diameter part 31b in this example). The rotational shaft 31 further has, in the area from the distal end of the small-diameter part 31b to near the step 31c, a locking surface 31d that is a portion of the peripheral surface of the rotational shaft 31 (on the small-diameter part 31b in this example) processed to be flat in one direction. As shown in FIG. 2, the locking surface 31d in the present embodiment is a peripheral surface of the rotational shaft 31 processed to be flat in one direction. Thus, this locking surface 31d is referred to as a D-cut surface. The rotational shaft 31 may include a plurality of locking surfaces 31d on the peripheral surface, instead of the single locking surface 31d.

The washers 41 are annular members each formed by punching a metal plate. The washers 41 each have a central through-hole 41a having an internal diameter smaller than the outer diameter of the large-diameter part 31a of the rotational shaft 31 and larger than the outer diameter of the small-diameter part 31b of the rotational shaft 31. The rubber washers 40 are substantially annular members formed from a rubber material, such as silicone rubber. The rubber washers 40 each have the insertion hole 40a at the center with the same shape as the cross section of the rotational shaft 31 having the locking surface 31d (D-shaped cross section in the present embodiment). The rubber washers 40 can receive the small-diameter part 31b of the rotational shaft 31 through the insertion hole 40a. The shape of the insertion hole 40a in each rubber washer 40 will be described in detail later. Each rubber washer 40 further has a cylindrical protrusion 40b on one surface. The use of this protrusion 40b will be described in detail later.

In FIG. 2, the rotatable disk 11 is not shown entirely but the rotation center and nearby components of the impeller 10 are shown partially. The impeller 10 has the mount hole 14 at its rotation center. As described in detail later, the mount hole 14 has an additional cutout to the shape of the insertion hole 40a of the rubber washer 40. The mount hole 14 of the rotatable disk 11 can also receive the small-diameter part 31b of the rotational shaft 31. The mount hole 14 is surrounded by four receiving holes 15 located at equal intervals. The receiving holes 15 each have the inner diameter that is the same as the outer diameter of the protrusion 40b on the rubber washer 40. The use of the receiving holes 15 will be described in detail later. In the present embodiment, the protrusion 40b on each rubber washer 40 and the receiving holes 15 in the rotatable disk 11 correspond to a locking unit of the claimed invention.

Figure 3:
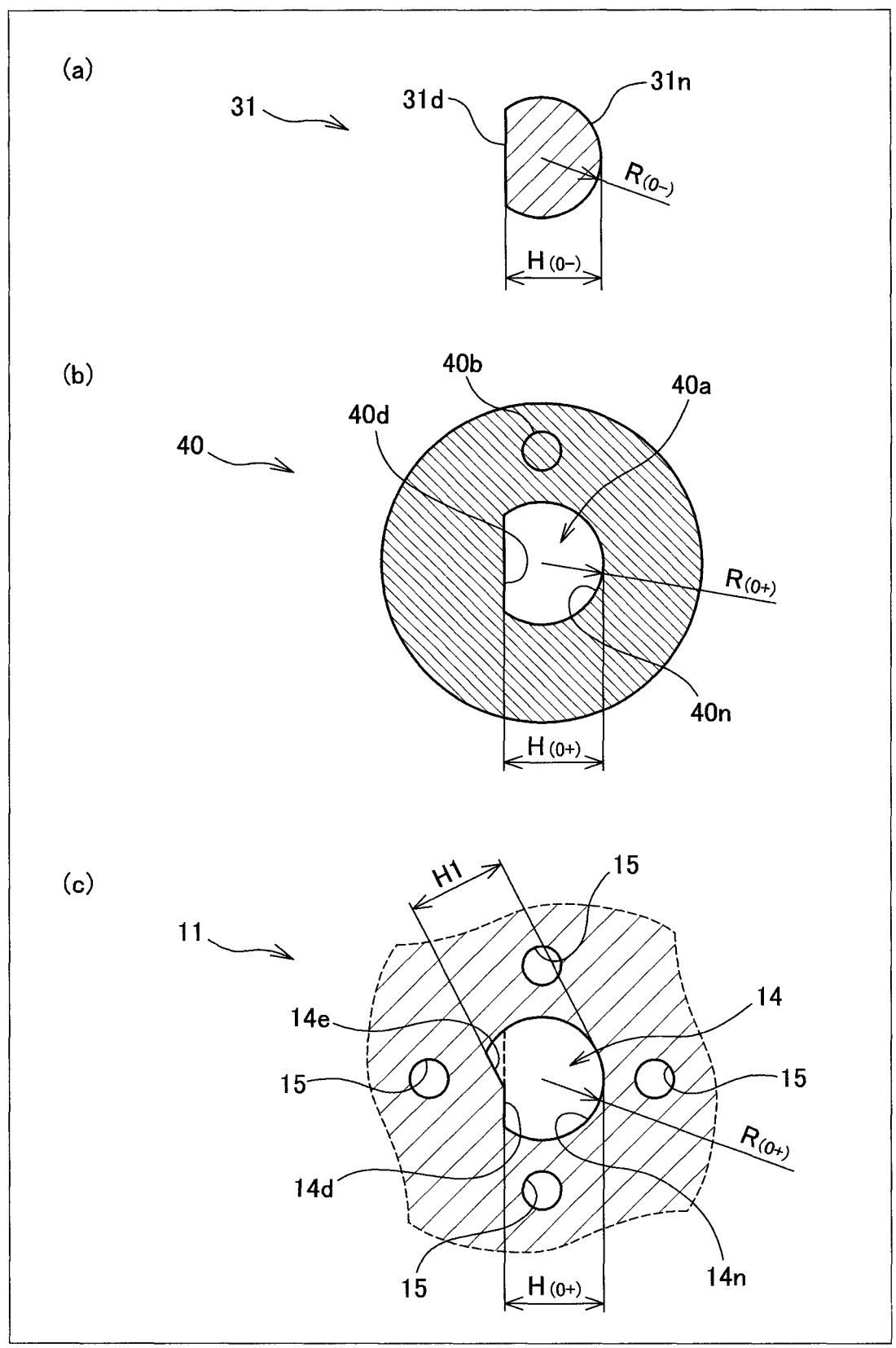
FIG. 3 is a diagram describing the cross-sectional shape of the rotational shaft 31, the shape of an insertion hole 40a in each rubber washer 40, and the shape of the mount hole 14 in a rotatable disk 11 of the impeller 10.

FIG. 3 is a diagram describing the cross-sectional shape of the rotational shaft 31 (small-diameter part 31b in this example), the shape of the insertion hole 40a in each rubber washer 40, and the shape of the mount hole 14 in the rotatable disk 11 of the impeller 10. As shown in FIG. 3(a), the rotational shaft 31 has a cross section including an arc portion corresponding to the threaded portion 31n and a linear portion corresponding to the locking surface 31d. The arc portion has a radius with a dimension R having a minus tolerance (to have a median value smaller than the dimension R and to have any dimensional increase within the tolerance without exceeding the dimension R). In FIG. 3(a), R(0−) indicates the dimension R with a minus tolerance. The distance between the linear portion corresponding to the locking surface 31d and a tangent to the arc portion parallel to the linear portion has a dimension H with a minus tolerance. In FIG. 3(a), H(0−) indicates the dimension H with a minus tolerance.

FIG. 3(b) shows the shape of the insertion hole 40a in the rubber washer 40 in detail. As shown in the figure, the insertion hole 40a also includes an arc portion 40n and a linear portion 40d. The arc portion 40n has a radius with a dimension R having a plus tolerance (to have a median value greater than the dimension R and to have any dimensional decrease within the tolerance without becoming less than the dimension R). In FIG. 3(b), R(0+) indicates the dimension R with a plus tolerance. The distance between the linear portion 40d and a tangent to the arc portion 40n parallel to the linear portion 40d has a dimension H with a plus tolerance. In FIG. 3(b), H(0+) indicates the dimension H with a plus tolerance. In this manner, the cross section of the rotational shaft 31 (small-diameter part 31b in this example) and the insertion hole 40a in each rubber washer 40 have the same shape as the cross section of the rotational shaft 31 (D-shaped cross section in the present embodiment). The cross section of the rotational shaft 31 has a minus tolerance, whereas the insertion hole 40a in each rubber washer 40 has a plus tolerance. As shown in FIG. 2, when the rubber washer 40 is attached to the rotational shaft 31 by placing it over the washer 41, the rubber washer 40 slips down along the rotational shaft 31 as positioned by the threaded portion 31n and the locking surface 31d of the rotational shaft 31, and stops when coming in contact with the washer 41.

FIG. 3(c) shows the shape of the mount hole 14 in the rotatable disk 11 of the impeller 10 in detail. As shown in the figure, the mount hole 14 also includes an arc portion 14n and a linear portion 14d. The arc portion 14n, like the insertion hole 40a in the rubber washer 40, has a radius with a dimension R having a plus tolerance. The distance between the linear portion 14d and a tangent to the arc portion 14n parallel to the linear portion 14d, like the insertion hole 40a in the rubber washer 40, also has a dimension H with a plus tolerance.

The mount hole 14 further has an additional cutout at one end of the linear portion 14d. In FIG. 3(c), the broken line indicates the linear portion 14d without the cutout. The mount hole 14 without the cutout at one end of the linear portion 14d has the same shape as the insertion hole 40a in the rubber washer 40 shown in FIG. 3(b). Thus, when the rotational shaft 31 is inserted through the mount hole 14 of the rotatable disk 11, the threaded portion 31n and the locking surface 31d of the rotational shaft 31 position the rotatable disk 11 in the same manner as the rubber washer 40. However, the mount hole 14 according to the present embodiment has the linear portion 14d with the additional cutout at its one end, which extends at an angle from the linear portion 14d in a direction away from the locking surface 31d of the rotational shaft 31. As a result, the mount hole 14 has a spacing portion 14e that is linear, in addition to the linear portion 14d. The distance between the linear spacing portion 14e and a tangent to the arc portion 14n parallel to the linear spacing portion 14e is a dimension H with a plus tolerance or a dimension H1 greater than the dimension H. The blower fan 1 according to the present embodiment includes the impeller 10 with the mount hole 14 further including the spacing portion 14e. This structure prevents metallic contact between the impeller 10 and the rotational shaft 31 when the impeller 10 is mounted on the rotational shaft 31 with the nut 42, and thus reduces noise resulting from electromagnetic vibration of the motor. The mechanism for such noise reduction will now be described. The use of the protrusion 40b on each rubber washer 40 and the receiving holes 15 in the rotatable disk 11 will also be described, following the mechanism for reducing noise of the blower fan 1.

Figure 4:
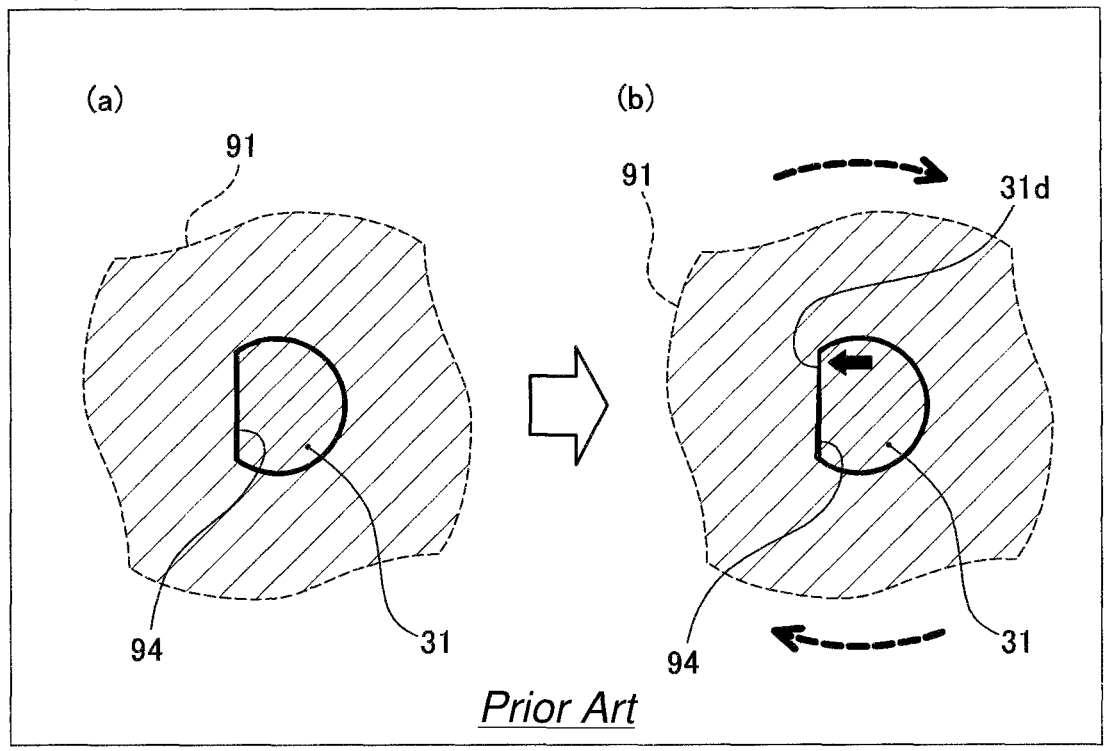
FIG. 4 is a diagram describing metallic contact between a rotatable disk 91 having a D-shaped mount hole 94 and a rotational shaft 31.

For ease of understanding, the mount hole 14 of the impeller 10 without the spacing portion 14e will be described briefly. FIG. 4 is a diagram describing metallic contact between a rotatable disk 91 of an impeller 10 having a D-shaped mount hole 94 (without the spacing portion 14e) and a rotational shaft 31. In FIG. 4(a), the D-shaped mount hole 94 receives the rotational shaft 31 (small-diameter part 31b in this example) having a D-shaped cross section. As described above with reference to FIG. 3, the D-shape of the mount hole 94 and the D-shaped cross section of the rotational shaft 31 have the same dimensions, and the D-shape of the mount hole 94 has a plus tolerance, and the D-shaped cross section of the rotational shaft 31 has a minus tolerance. When the mount hole 94 receives the rotational shaft 31, the mount hole 94 and the rotational shaft 31 can partially be in slight contact with each other, but there is not strong metallic contact between them.

As described above with reference to FIG. 2, the rubber washers 40 are attached on both surfaces of the rotatable disk 91, and the washers 41 are further attached on the rubber washers 40. In this state, the nut 42 is attached to the threaded portion 31n at the distal end of the rotational shaft 31. The nut 42 is rotated toward the washer 41 until coming in contact with the washer 41, and then is rotated while being pressed strongly against the washer 41. The washer 41 is rotated in the same direction as the nut 42 under the frictional force applied from the nut 42, and strongly presses the two rubber washers 40 (and the rotatable disk 11 or 91) located below the washer 41. The upper surfaces (adjacent to the nut 42) of the rubber washers 40 are urged to rotate in the same direction as the nut 42 and deform for twisting, causing the rotatable disk 91 to rotate in the same direction as the nut 42. Thus, as shown in FIG. 4(b), strong metallic contact occurs between the linear portion of the D-shaped mount hole 94 and the locking surface 31d (D-cut surface) of the rotational shaft 31. In FIG. 4(b), the thick-dashed arrows indicate the rotation direction of the nut 42, and the black solid arrow indicates the point at which such strong metallic contact occurs. In this state, the electromagnetic vibration of the motor 30 propagates to the impeller 10 through the rotational shaft 31 and the rotatable disk 91 and generates noise.

Figure 5:
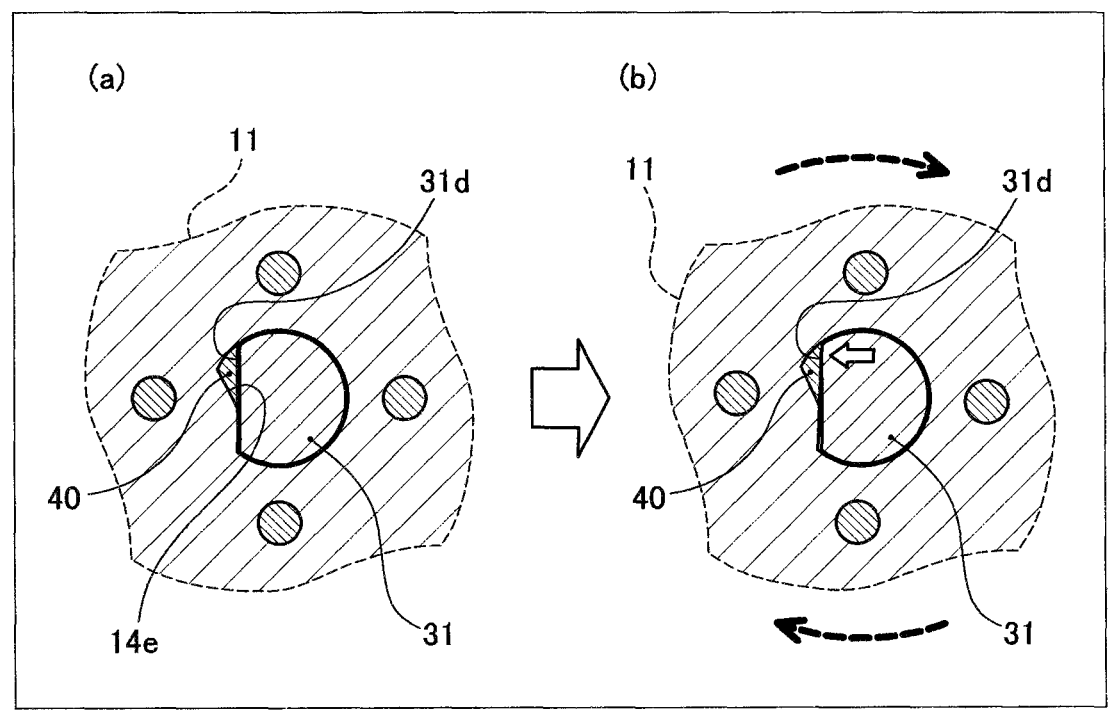
FIG. 5 is a diagram describing a mechanism of avoiding metallic contact between the rotatable disk 11 of the impeller 10 and the rotational shaft 31 of the motor 30 in the blower fan 1 according to the present embodiment.

FIG. 5 is a diagram describing the spacing portion 14e of the mount hole 14 of the impeller 10 to prevent the vibration of the motor 30 from propagating to the impeller 10 and generating noise. In FIG. 5(a), the mount hole 14 of the rotatable disk 11 of the impeller 10 receives the distal end (specifically, a part with the locking surface 31d) of the rotational shaft 31 (small-diameter part 31b in this example). As described above with reference to FIG. 3, the mount hole 14 in the rotatable disk 11 includes the spacing portion 14e that extends at an angle away from the linear portion 14d. However, the insertion hole 40a in the rubber washer 40 has the same shape as the cross section of the rotational shaft 31 and has no such spacing portion. Around the spacing portion 14e in the mount hole 14, as shown in FIG. 5(a), the rubber washer 40 is in slight contact with (or faces across a small clearance) the locking surface 31d of the rotational shaft 31, and the rotatable disk 11 is spaced from the locking surface 31d of the rotational shaft 31.

In this state, the nut 42 (refer to FIG. 2) at the distal end of the rotational shaft 31 is rotated into the state shown in FIG. 5(b). As the nut 42 rotates and the washer 41 rotates while strongly pressing the upper surface of the rubber washer 40, the rubber washer 40 deforms for twisting, causing the rotatable disk 11 to rotate in the rotation direction of the nut 42. However, the mount hole 14 in the rotatable disk 11 includes the spacing portion 14e, which cannot come in contact with the locking surface 31d of the rotational shaft 31 although a twist in the rubber washer 40 rotates the rotatable disk 11. As indicated with a white arrow in the figure, the twisted rubber washer 40 can have its linear portion 40d (refer to FIG. 3(b)) pressed against the locking surface 31d (refer to FIG. 3(a)) of the rotational shaft 31. However, the part of the rubber washer 40 that is strongly pressed against the rotational shaft 31 propagates no electromagnetic vibration of the motor 30 to the impeller 10, and thus avoids noise.

As described above with reference to FIGS. 3(b) and 3(c), each rubber washer 40 has the cylindrical protrusion 40b on one surface, and the rotatable disk 11 has the receiving holes 15. This structure is required to determine the mounting angle of the rotatable disk 11 about the rotational shaft 31. More specifically, the impeller 10 according to the present embodiment includes the rotatable disk 11 with the mount hole 14 including the spacing portion 14e, and thus allows some degree of angle flexibility in mounting the rotatable disk 11 about the rotational shaft 31 when the mount hole 14 receives the rotational shaft 31 (small-diameter part 31b in this example). Thus, when the impeller 10 is mounted on the rotational shaft 31 with the nut 42, the rotatable disk 11 may be mounted at an undesirable angle.

Figure 6:
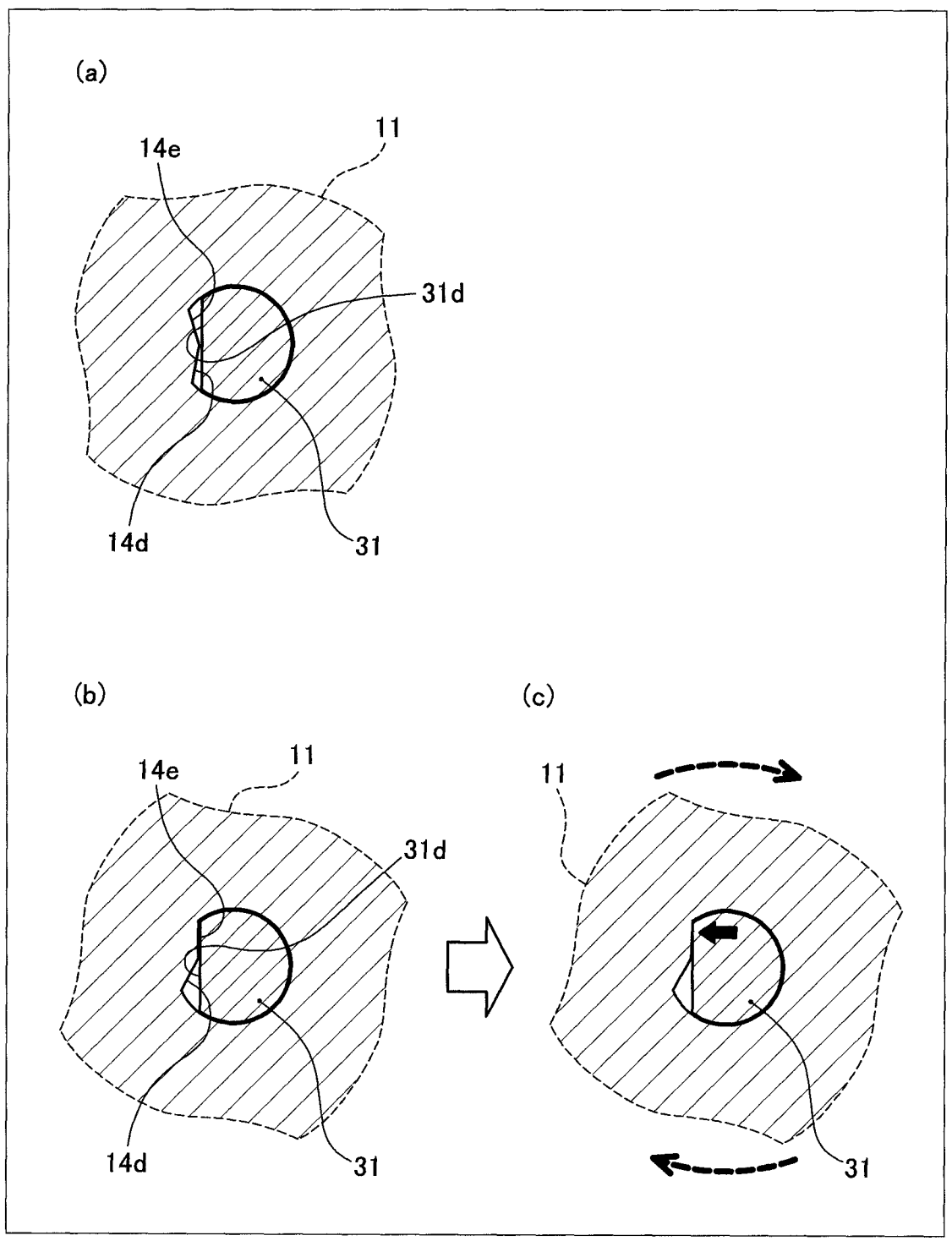
FIG. 6 is a diagram describing the use of protrusions 40b on the rubber washers 40 to be fitted in receiving holes 15 in the rotatable disk 11.

For example, as shown in FIG. 6(a), both the linear portion 14d and the spacing portion 14e of the mount hole 14 in the rotatable disk 11 may be spaced from the locking surface 31d of the rotational shaft 31. As shown in FIG. 6(b), the spacing portion 14e of the mount hole 14 may be in slight contact with (or face across a small clearance) the locking surface 31d, whereas the linear portion 14d of the mount hole 14 is spaced from the locking surface 31d. As the rotatable disk 11 of the impeller 10, the washers 41, and the rubber washers 40 are fastened with the nut 42 in the state shown in FIG. 6(b), a twist in the rubber washers 40 slightly rotates the rotatable disk 11, possibly causing strong metallic contact between the spacing portion 14e of the mount hole 14 and the locking surface 31d of the rotational shaft 31.

To prevent such strong metallic contact, the rubber washers 40 according to the present embodiment each have the protrusion 40b on one surface, and the rotatable disk 11 of the impeller 10 has the receiving holes 15 around the mount hole 14. When the impeller 10 is mounted on the rotational shaft 31, the protrusion 40b on one rubber washer 40 is fitted into the corresponding receiving hole 15 from below the rotatable disk 11 while facing upward to attach the rubber washer 40 to the rotatable disk 11. Further, the other rubber washer 40 is inverted to turn the protrusion 40b downward, and then the protrusion 40b is fitted into the receiving hole 15 from above the rotatable disk 11 to attach the other rubber washer 40 to the rotatable disk 11. The receiving holes 15 in the rotatable disk 11 are positioned to cause the linear portions 40d (refer to FIG. 3(b)) of the insertion holes 40a in the rubber washers 40 to align with the linear portion 14d (refer to FIG. 3(c)) of the mount hole 14 in the rotatable disk 11 when the two rubber washers 40 are attached. The rotatable disk 11 can simply have two receiving holes 15 to receive the protrusions, but the rotatable disk 11 according to the present embodiment has the four receiving holes 15 to avoid a weight difference between a direction connecting the two receiving holes 15 for receiving the protrusions and its orthogonal direction.

As described above, the insertion hole 40a in the rubber washer 40 has the same shape as the cross section of the rotational shaft 31, and thus the rubber washer 40 is positioned in a manner not rotatable with respect to the rotational shaft 31 when the insertion hole 40a in the rubber washer 40 receives the rotational shaft 31. The rotatable disk 11 has the receiving holes 15 receiving the protrusions 40b on the rubber washers 40, and is also positioned in a manner not rotatable with respect to the rotational shaft 31. Thus, when the impeller 10 is mounted on the rotational shaft 31 with the nut 42, this structure prevents strong metallic contact described with reference to FIG. 6(c) between the spacing portion 14e of the mount hole 14 and the locking surface 31d of the rotational shaft 31, thus reliably preventing large noise from being generated when the impeller 10 is rotated by the motor 30.

As described above with reference to FIG. 3(c), in the above embodiment, the dimension H1 (distance between the spacing portion 14e of the mount hole 14 and the tangent to the arc portion 14n parallel to the spacing portion 14e) is greater than or equal to the dimension H (distance between the linear portion 14d of the mount hole 14 and the tangent to the arc portion 14n parallel to the linear portion 14d) for the reason described below.

Figure 7:
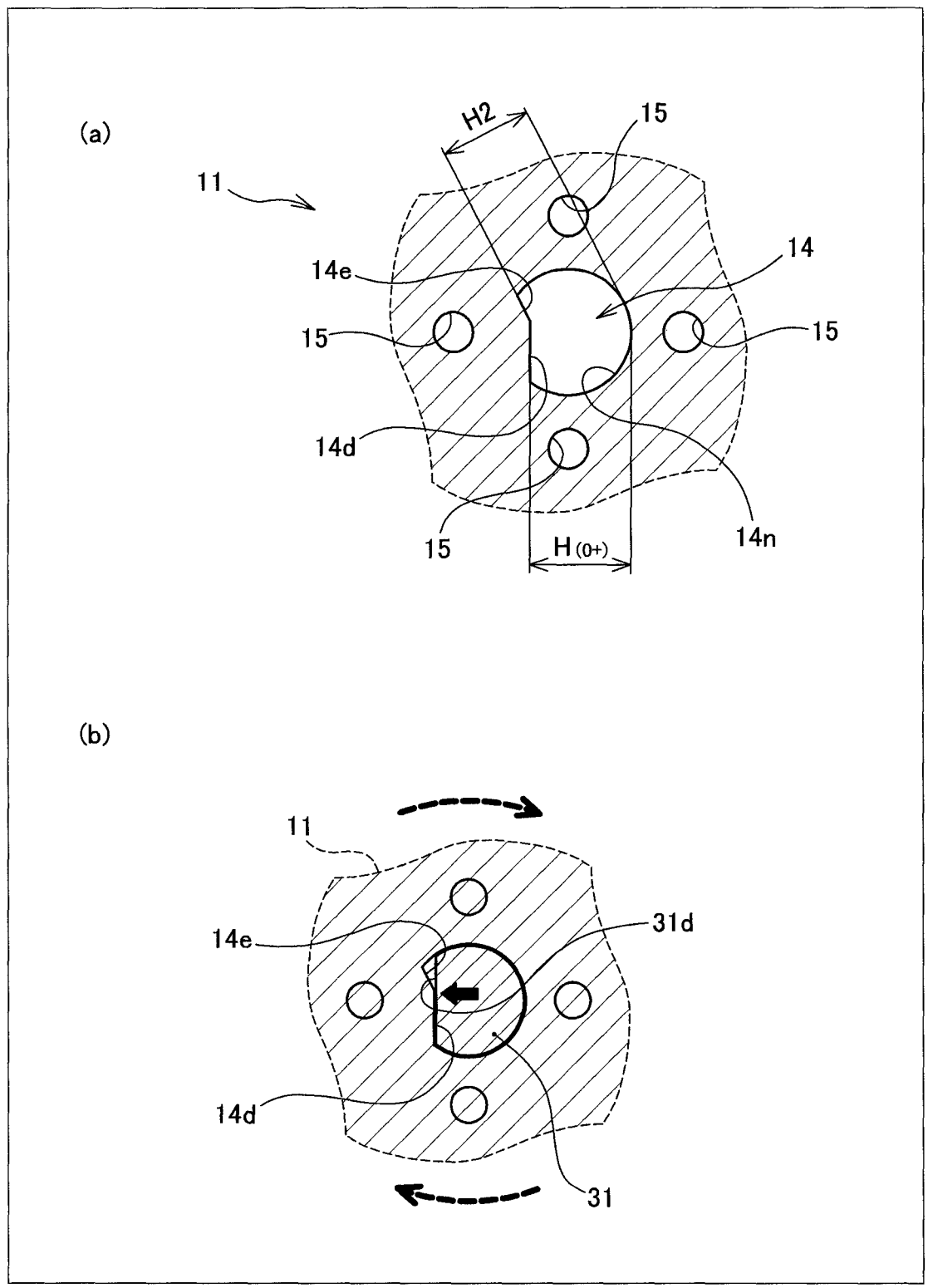
FIG. 7 is a diagram describing a possible disadvantage of a mount hole 14 with a dimension H2 smaller than a dimension H.

In the example shown in FIG. 7, the distance between the spacing portion 14e of the mount hole 14 and the tangent to the arc portion 14n parallel to the spacing portion 14e is a dimension H2 smaller than the dimension H (refer to FIG. 7(a)). In comparison with the structure shown in FIG. 3(c), the mount hole 14 in FIG. 7(a) with the dimension H2 has the linear portion 14d longer than the linear portion 14d of the mount hole 14 in FIG. 3(c).

When the rotational shaft 31 is placed through the rotatable disk 11 having the mount hole 14 shown in FIG. 7(a), and the nut 42 attached to the rotational shaft 31 is rotated for fastening, a twist in the rubber washers 40 urges the rotatable disk 11 to rotate. In FIG. 7(b), thick-dashed arrows indicate the rotation direction of the rotatable disk 11. The mount hole 14 in FIG. 7(a) has the extended linear portion 14d. When the rotatable disk 11 rotates, the extended end of the linear portion 14d is strongly pressed against the locking surface 31d of the rotational shaft 31, causing metallic contact between them in the same manner as described with reference to FIG. 5. To prevent such strong metallic contact, the rotatable disk 11 of the impeller 10 according to the present embodiment has the dimension H1 (refer to FIG. 3(c)) of the mount hole 14 greater than or equal to the dimension H (refer to FIG. 3(c)).

The rotatable disk 11 in the blower fan 1 according to the above embodiment may be modified variously. Rotatable disks 11 according to modifications will now be described focusing on their differences from the above embodiment.

As described above with reference to FIG. 3(c), the rotatable disk 11 according to the above embodiment has the mount hole 14 with the dimension H1 greater than or equal to the dimension H. The dimension H1 may be slightly smaller than the dimension H. This modification eliminates the protrusions 40b on the rubber washers 40 and the receiving holes 15 in the rotatable disk 11.

Figure 8:
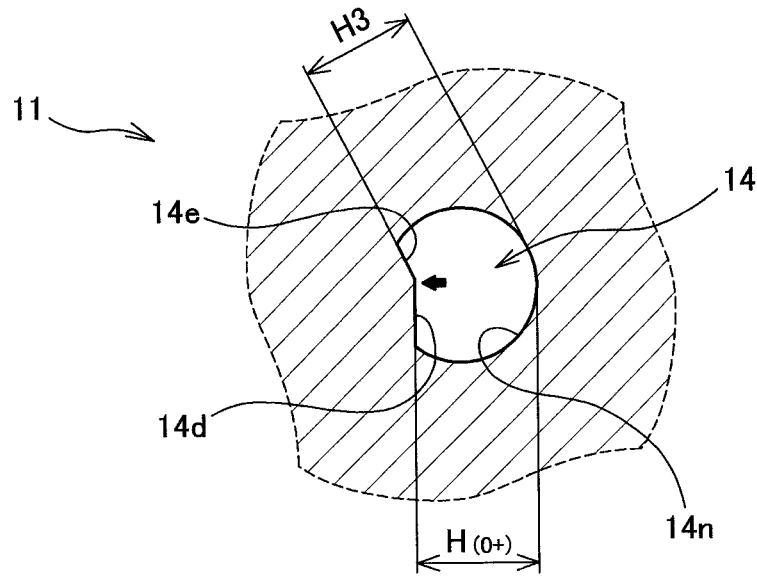
FIG. 8 is a diagram describing a modification with a mount hole 14 having a dimension 3 slightly smaller than the dimension H.

FIG. 8 is a diagram describing a modification in which the distance between the spacing portion 14e of the mount hole 14 and the tangent to the arc portion 14n parallel to the spacing portion 14e is a dimension H3 slightly smaller than the dimension H (distance between the linear portion 14d of the mount hole 14 and the tangent to the arc portion 14n parallel to the linear portion 14d). The mount hole 14 according to the present modification has the linear portion 14d extended in the same manner as shown in FIG. 7(a) but shorter than the linear portion 14d in FIG. 7(a).

When the rotational shaft 31 is placed through the mount hole 14 according to the present modification, the slightly extended linear portion 14d comes in contact with the locking surface 31d (refer to FIG. 2) of the rotational shaft 31, and regulates the rotation of the rotatable disk 11 about the rotational shaft 31. This prevents the spacing portion 14e of the mount hole 14 from coming in contact with the locking surface 31d of the rotational shaft 31. When the rotatable disk 11 of the impeller 10 rotates in mounting the impeller 10 on the rotational shaft 31 with the nut 42, the extended end of the linear portion 14d of the mount hole 14 is strongly pressed against the locking surface 31d of the rotational shaft 31. However, with the linear portion 14d extended only slightly, a force urging the rotatable disk 11 to rotate is applied locally in a small area on the distal end of the linear portion 14d that is pressed by the locking surface 31d, deforming the distal end of the linear portion 14d. With only the small area on the distal end of the linear portion 14d deformed, the deformed portion can be rounded (or smoothed), and is subsequently less likely to receive strong metallic contact. This eliminates strong metallic contact between the linear portion 14d of the mount hole 14 and the locking surface 31d of the rotational shaft 31. After the impeller 10 is mounted on the rotational shaft 31 with the nut 42, the electromagnetic vibration of the motor 30 is prevented from propagating to the impeller 10 through the rotational shaft 31 to reduce noise of the blower fan 1.

Figure 9:
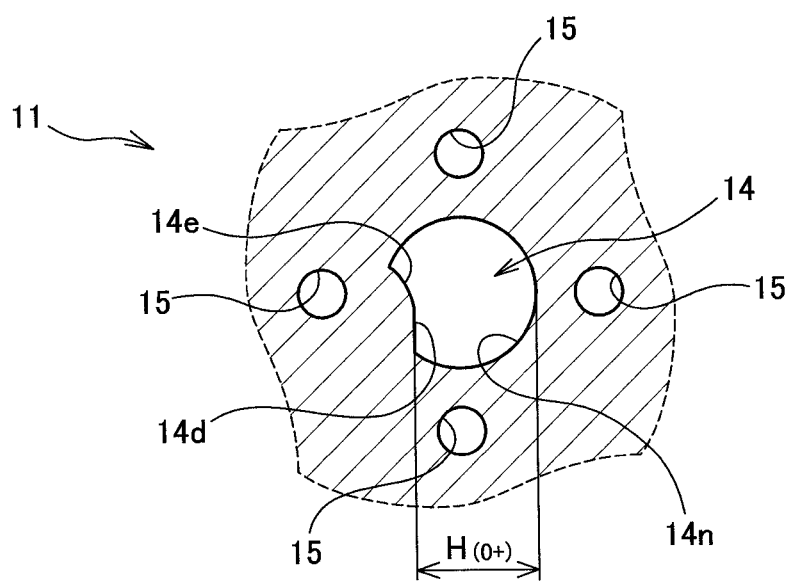
FIG. 9 is a diagram describing a modification with a mount hole 14 including a curved spacing portion 14e.

In the above embodiment and modification, the spacing portion 14e of the mount hole 14 extends linearly. However, the spacing portion 14e may not extend linearly but may be in any shape that extends at an angle from the linear portion 14d of the mount hole 14 to be away from the locking surface 31d of the rotational shaft 31. As shown in FIG. 9, for example, the spacing portion 14e may be curved.

Figure 10:
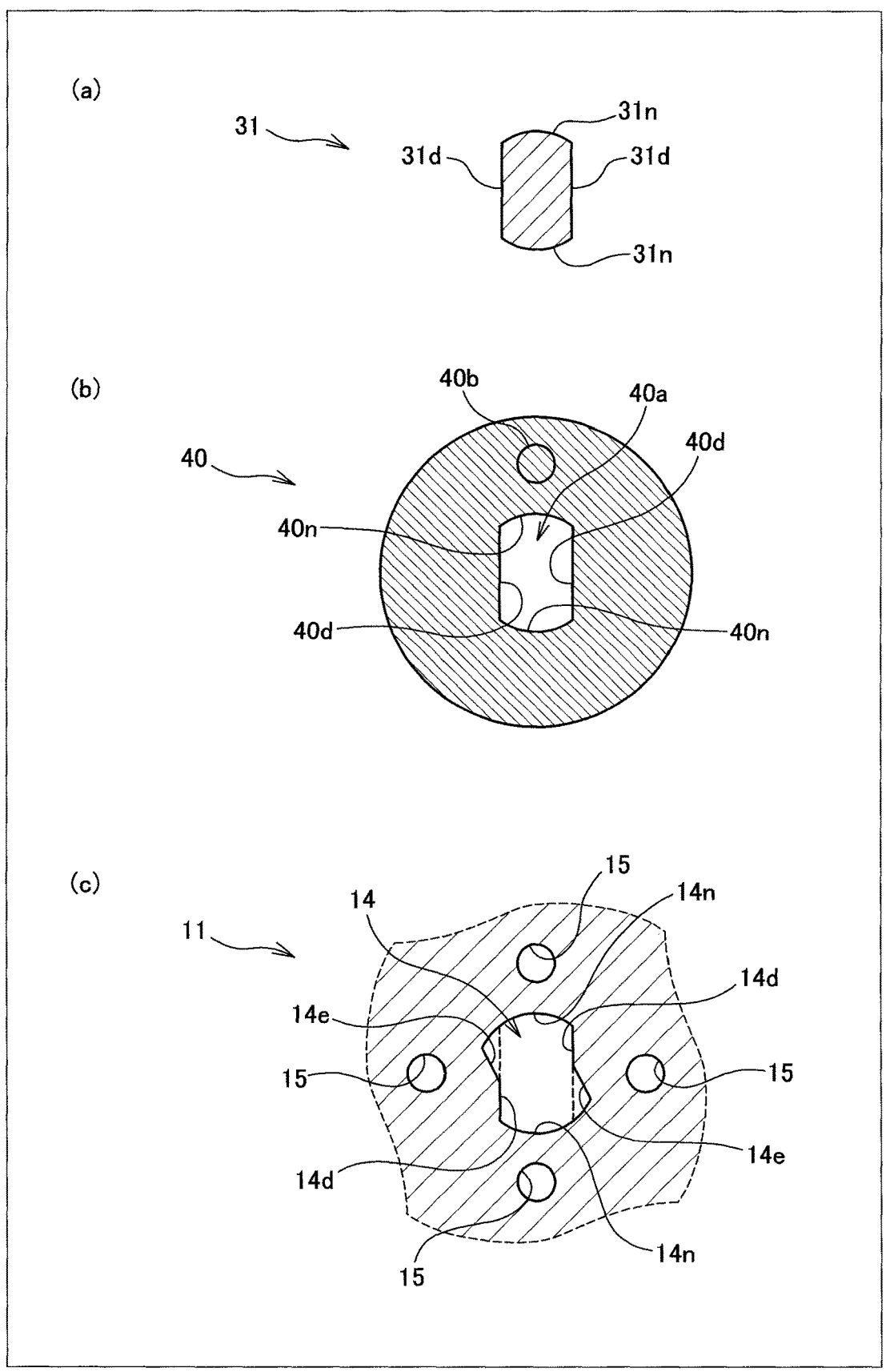
FIG. 10 is a diagram describing a modification with a rotational shaft 31 having a plurality of locking surfaces 31d.

In the above embodiment and modifications, the rotational shaft 31 has the single locking surface 31d on its peripheral surface. However, the rotational shaft 31 may include, on the peripheral surface, a plurality of locking surfaces 31d. For example, when the rotational shaft 31 has two locking surfaces 31d as shown in FIG. 10(a), the insertion hole 40a in each rubber washer 40 has the two linear portions 40d in the arc portion 40n as shown in FIG. 10(b). The mount hole 14 in the rotatable disk 11 may include the arc portion 14n including two linear portions 14d each including the spacing portion 14e. In this modification as well, the linear portions 14d each have the spacing portion 14e, thus preventing the rotatable disk 11 from being strongly pressed against the locking surface 31d of the rotational shaft 31 and from causing metallic contact when the impeller 10 is mounted on the rotational shaft 31 with the nut 42. This prevents the electromagnetic vibration of the motor 30 from propagating to the impeller 10 through the rotational shaft 31, thus reducing noise of the blower fan 1.

Although the present embodiment and the various modifications have been described above, the present invention is not limited to the above embodiments. The present invention may be modified in various manners without departing from the scope and the spirit of the invention.

REFERENCE SIGNS LIST 1 blower fan
10 impeller
11 rotatable disk
12 blade
13 coupling plate
14 mount hole
14d linear portion
14e spacing portion
14n arc portion
15 receiving hole
20 fan case
21 opening
22 inlet
23 outlet
30 motor
31 rotational shaft
31a large-diameter part
31b small-diameter part
31c step
31d locking surface
31n threaded portion
32 attaching portion
35 fixing plate
40 rubber washer
40a insertion hole
40b protrusion
40d linear portion
40n arc portion
41 washer
41a through-hole
42 nut

The invention claimed is:

1. A blower fan for blowing air by rotating an impeller with a motor, the blower fan comprising:
a motor including a rotational shaft having a threaded portion at a distal end of the rotational shaft;
an impeller having a mount hole through which the rotational shaft is placed, the mount hole being a through-hole at a rotation center;
rubber washers sandwiching a portion of the impeller having the mount hole, the rubber washers having insertion holes through which the rotational shaft is placed; and
a nut placed on the threaded portion of the rotational shaft placed through the impeller and the rubber washers to fix the impeller to the rotational shaft,
wherein the rotational shaft includes, within a predetermined length from the distal end, a locking surface that is a flat portion of a peripheral surface of the rotational shaft to lock rotation of the impeller with respect to the rotational shaft,
the insertion holes of the rubber washers and the mount hole of the impeller through which the rotational shaft is placed each include an arc portion positioned with respect to the peripheral surface of the rotational shaft and a linear portion positioned with respect to the locking surface of the rotational shaft, and
a spacing portion of the linear portion of the mount hole extends in a direction away from the locking surface and reaches an inner-circumference of the mount hole, so as to form a cut out surrounded by the spacing portion of the mount hole, the inner-circumference of the mount hole, and the locking surface of the rotational shaft.

2. The blower fan according to claim 1, wherein
the locking surface is a D-cut surface of the rotational shaft,
the spacing portion included in the mount hole of the impeller is linear, and
a distance between a tangent to the arc portion of the mount hole parallel to the spacing portion is greater than or equal to a distance between a tangent to the arc portion of the mount hole parallel to the linear portion of the mount hole.

3. The blower fan according to claim 2, wherein
the rubber washers and the impeller include a locking unit to lock rotation of the impeller with respect to the rubber washers about the rotational shaft.

4. The blower fan according to claim 3, wherein
the locking unit includes a protrusion on at least one of the rubber washers and a receiving hole in the impeller receiving the protrusion.

5. The blower fan according to claim 1, wherein
the rubber washers and the impeller include a locking unit to lock rotation of the impeller with respect to the rubber washers about the rotational shaft.

6. The blower fan according to claim 5, wherein
the locking unit includes a protrusion on at least one of the rubber washers and a receiving hole in the impeller receiving the protrusion.

* * * * *